March 16, 1937. H. P. HANSEN 2,073,931
STEERING FACILITIES OF AN AUTOMOBILE
Filed March 28, 1936
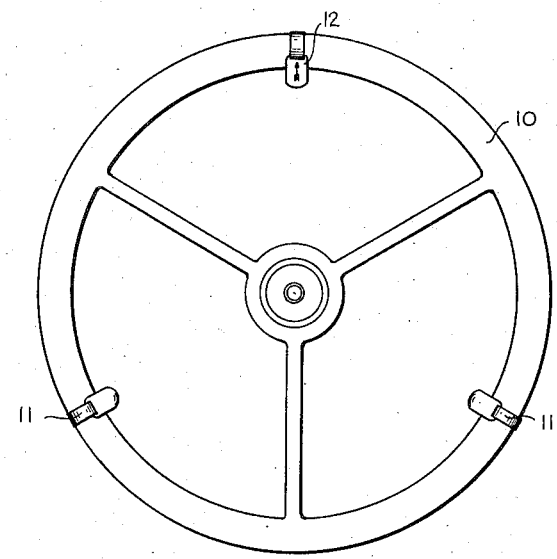
FIG.1
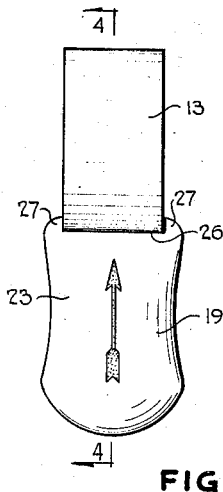
FIG.2
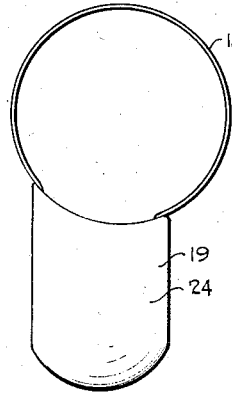
FIG.3
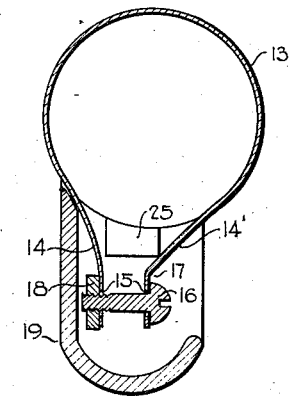
FIG.4
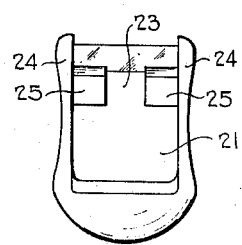
FIG.5
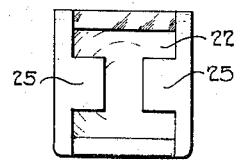
FIG
INVENTOR
HANS P HANSEN
Peter M. Boesen
ATTORNEY Patented Mar. 16, 1937

2,073,931

UNITED STATES PATENT OFFICE 2,073,931

STEERING FACILITIES OF AN AUTOMOBILE

Hans Peter Hansen, New York, N. Y.

Application March 28, 1936, Serial No. 71,509

5 Claims. (Cl. 74—557)

This invention relates to new and useful improvements in the steering facilities of an automobile, and it has more particularly for its object to provide means associated with the steering wheel of a car, whereby a more safe and comfortable driving may be accomplished, as the said device will prevent any slip of the hands, and any groping relative to the operation of the steering wheel, introducing at the same time the feature and element of rest and relaxation into the otherwise quite often strenuous pursuit of driving a car.

Incidentally, my device will also serve as a guide, or indicator as to the exact position of the front wheels of a car, after the latter has been placed near the curb, or in parked position.

With the above and other objects in view, this invention consists of the novel features of construction, combination, and arrangement of parts, hereinafter fully described, claimed and illustrated in the accompanying drawing forming part of this specification, and in which similar characters of reference indicate corresponding parts in all views, and in which:

Figure 1 is a top plan view of a steering wheel, showing my device attached to the latter.

Figure 2 is a top plan view of my said device, comprising a ring and a knob member, and illustrating the guide, or master-knob.

Figure 3 is an edge view of my device; while

Figure 4 shows a transverse sectional view, taken on the line 4—4 in Figure 2.

Figure 5 is a front elevational bottom view of the detachable knob, the wheel engaging member, or ring having here been omitted; and Figure 6 is a top plan view of my device, as shown in Figure 5.

Referring more particularly to the drawing, 10 indicates an automobile steering wheel to which my safety and resting knob member 11 is attached. Three of said knobs being attached to the wheel at an equal distance between the spokes of the latter, and one of said knobs, the master knob 12, being positioned at the center of the front of the wheel, so that, when a car is parked, the driver of the latter will always know, by means of an arrow upon said master knob, the exact position of the front wheels of the car, thus avoiding any uncertainty as to the appropriate turn to be made, when starting a car.

The device proper comprises a substantially flexible member bent into the shape of a ring 13, with the end portions thereof forming projections, one of the latter 14 being somewhat tangential to the curvature of the ring member 13, and the other 14' being formed with an abrupt bend 17 thereon; the extreme end portions of said projections being somewhat parallel to each other. Said end portions 14 and 14' are formed with apertures 15, 15 therein adapted to receive a screw-bolt 16, which in turn is engaged opposite said projections by a square nut 18 into which said screw-bolt is threaded for the purpose of regulating the width between said projections 14 and 14' in tightening the latter together, when securing the ring member 13 snugly to the steering wheel 10.

A casing, or somewhat box-shaped member, or knob 19 is formed with a rounded bottom portion and is open upon one side thereof, as shown at 21 in Figure 5, and is also open at the top, as shown at 22 in Figure 6.

The rear wall 23, when viewing Figure 5, or upper surface in Figure 2, when viewing the latter, of said box, or knob member, is projecting slightly above the side walls 24, 24, in order to form a snug fitting and stream-line connection with the ring member 13, when said knob is attached to the latter. The side walls 24, 24 are made with horizontally and inwardly projecting lugs 25, 25 arranged somewhat near the center, and upon the top of said walls.

In practice, the said device is secured to the steering wheel by first attaching the ring member loosely to the latter, this is done by means of the screw 16 inserted through the apertures 15 and 15' and held by the square nut 18; next in turn, the knob member 19 is connected to the ring member by slipping the projections 14 and 14', loosely held by the screw 16, over the lugs 25, 25, as the latter pass between said projections, while at the same time the screw 16 passes through the open space between the lugs 25, 25. It must in this connection be noted that the knob-member 19 is provided with a slight recess in its top, as shown especially at 26 in Figure 2, thus providing two small guiding lugs 27, 27 for the ring member 13, serving especially to keep the said knob and the ring member in straight position, when the latter is fastened onto the steering wheel.

Once the said parts 13 and 19 have thus been connected, proper adjustment is made of the said device, relative to the steering wheel, as the screw 16 is tightened with the result that the projections 14 and 14' are solidly locked behind the lugs 25, 25, thereby securing the said device in a firm position upon the steering wheel.

It is obvious that changes may be made in the construction, and arrangement of the several parts, as shown herein, within the scope of the appended claims, and I do not therefore wish to limit myself to the exact construction and arrangement shown and described herein.

Having thus described my invention, what I claim as new and desire to secure by Letters Patent of the United States, is:—

1. In a device of the class described, in combination with a steering wheel, a knob-member, the latter comprising a substantially ring-shaped member formed with projecting flanges and adapted to encircle the rim of said steering wheel, a substantially box-shaped enclosure open at one side and at the top thereof, studs arranged at the upper end of said enclosure and extending partially across the open space at the top thereof, the studs of said enclosure being adapted to slide between the ends of the flanges of the ring-shaped member, and a screw-bolt mounted through said flanges and adapted to tighten the ring member relative to the rim of the steering wheel and to the enclosure, respectively.

2. In a device of the class described, in combination with a steering wheel, a knob-member, the latter comprising a substantially ring-shaped member formed with projecting flanges and adapted to encircle the rim of said steering wheel, said flanges being made with apertures therein adapted to receive a screw-bolt, a nut threaded upon the end of the latter and outside of and relative to said flanges, a hood-member formed with an open top portion, studs arranged at the upper end of said hood-member and partially bridging the open space at the top thereof, said studs being adapted to slide between the flanges of the ring-member, and the screw-bolt in said flanges being simultaneously adapted to slide between the studs in engaging said hood-member to the ring-member, said screw-bolt being made to tighten the hood-member to the ring-member and to the rim of the steering wheel, respectively.

3. In a device, as claimed in claim 1, and wherein the box-shaped enclosure at its top is provided with lugs adapted to guide the ring member in securing a straight adjustment of the device to the steering wheel.

4. In a device of the class described, in combination with a steering wheel, a knob-member, the latter comprising a substantially ring-shaped member formed with projecting flanges and adapted to encircle the rim of said steering wheel, a substantially box-shaped enclosure partially open, lugs arranged upon said enclosure and extending partially across the open space thereof, said lugs being adapted to engage the flanges of the ring-shaped member, and a screw-bolt mounted through said flanges and adapted to tighten the ring member relative to the rim of the steering wheel and to the enclosure, respectively.

5. In a device of the class described, in combination with a steering wheel, a knob-member, the latter comprising a substantially ring-shaped member formed with projecting flanges and adapted to encircle the rim of said steering wheel, said flanges being made with apertures therein adapted to receive a screw-bolt, a nut threaded upon the end of the latter and outside of and relative to said flanges, a hood-member having an open top portion, means formed upon said hood member and adapted to engage the flanges of the ring member, the screw-bolt securing said hood-member to the ring member and to the steering wheel, respectively.

HANS PETER HANSEN.